United States Patent
Park et al.

(10) Patent No.: US 12,169,659 B2
(45) Date of Patent: Dec. 17, 2024

(54) ELECTRONIC DEVICE FOR MANAGING SCREEN OF DISPLAY AND OPERATION METHOD OF THE ELECTRONIC DEVICE

(71) Applicant: SAMSUNG ELECTRONICS CO., LTD., Suwon-si (KR)

(72) Inventors: Junkyu Park, Suwon-si (KR); Jooyoung Jeon, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 17/884,833

(22) Filed: Aug. 10, 2022

(65) Prior Publication Data

US 2023/0052203 A1 Feb. 16, 2023

Related U.S. Application Data

(63) Continuation of application No. PCT/KR2022/011860, filed on Aug. 9, 2022.

(30) Foreign Application Priority Data

Aug. 10, 2021 (KR) .................. 10-2021-0105327
Sep. 27, 2021 (KR) .................. 10-2021-0127292

(51) Int. Cl.
*G06F 3/14* (2006.01)
*G06F 1/16* (2006.01)
*G06F 3/041* (2006.01)

(52) U.S. Cl.
CPC .......... *G06F 3/1423* (2013.01); *G06F 1/1652* (2013.01); *G06F 3/0416* (2013.01)

(58) Field of Classification Search
None
See application file for complete search history.

(56) References Cited

U.S. PATENT DOCUMENTS

| | | |
|---|---|---|
| 2013/0086508 A1 | 4/2013 | Oguz et al. |
| 2015/0100813 A1 | 4/2015 | Han et al. |

(Continued)

FOREIGN PATENT DOCUMENTS

| | | |
|---|---|---|
| KR | 10-2015-0040127 A | 4/2015 |
| KR | 10-2206948 | 5/2015 |

(Continued)

OTHER PUBLICATIONS

International Search Report dated Nov. 10, 2022 issued in International Application No. PCT/KR2022/011860 with partial English translation (5 pages).

(Continued)

*Primary Examiner* — James A Thompson
(74) *Attorney, Agent, or Firm* — Nixon & Vanderhye, P.C.

(57) ABSTRACT

Various embodiments of the disclosure relate to an electronic device for managing a screen of a display and an operation method in the electronic device. According to an embodiment, the electronic device may include: a display module including a display configured to be deformable, a memory, and at least one processor electrically coupled to the display module and the memory. The at least one processor may be configured to: obtain first state information related to a screen for displaying objects of execution applications, obtain second state information related to deformation of the display, generate a view of a mini-application executable on the screen based on the first state information and the second state information, and control the display module to display the screen configured to include the generated view of the min-application in a (Continued)

display area visible to the outside based on the deformation of the display.

20 Claims, 16 Drawing Sheets

(56) References Cited

U.S. PATENT DOCUMENTS

| | | |
|---|---|---|
| 2015/0169211 A1 | 6/2015 | Shin et al. |
| 2015/0339093 A1 | 11/2015 | Cho et al. |
| 2017/0090681 A1* | 3/2017 | Gao .................... H04M 1/0268 |
| 2017/0147189 A1 | 5/2017 | Ryu et al. |
| 2018/0081398 A1 | 3/2018 | Shin et al. |
| 2018/0335920 A1* | 11/2018 | Tyler .................. G06F 3/04883 |
| 2018/0364827 A1 | 12/2018 | Chung |
| 2020/0004297 A1* | 1/2020 | Rekapalli ............. G06F 1/1618 |
| 2020/0401190 A1 | 12/2020 | Sim et al. |
| 2021/0096675 A1 | 4/2021 | Klein et al. |
| 2021/0096887 A1 | 4/2021 | Klein et al. |
| 2022/0215815 A1 | 7/2022 | Kim et al. |
| 2023/0005402 A1* | 1/2023 | Peng ....................... G06F 3/013 |
| 2023/0051784 A1* | 2/2023 | Lee ....................... G06F 3/0489 |

FOREIGN PATENT DOCUMENTS

| | | |
|---|---|---|
| KR | 10-2015-0134569 A | 12/2015 |
| KR | 10-1613838 B1 | 5/2016 |
| KR | 10-2017-0060519 A | 6/2017 |
| KR | 10-2018-0031373 A | 3/2018 |
| KR | 10-2019-0090982 | 8/2019 |
| KR | 10-2020-0054725 | 5/2020 |
| KR | 10-2021-0035447 | 4/2021 |

OTHER PUBLICATIONS

Written Opinion dated Nov. 10, 2022 issued in International Application No. PCT/KR2022/011860 (6 pages).

* cited by examiner

ELECTRONIC DEVICE FOR MANAGING SCREEN OF DISPLAY AND OPERATION METHOD OF THE ELECTRONIC DEVICE

CROSS-REFERENCE TO RELATED APPLICATIONS

This application is a continuation of International Application No. PCT/KR2022/011860 designating the United States, filed on Aug. 9, 2022, in the Korean Intellectual Property Receiving Office and claiming priority to Korean Patent Application No. 10-2021-0105327, filed on Aug. 10, 2021, in the Korean Intellectual Property Office, and to Korean Patent Application No. 10-2021-0127292, filed on Sep. 27, 2021, in the Korean Intellectual Property Office, the disclosures of all of which are incorporated by reference herein in their entireties.

BACKGROUND

Field

The disclosure relates to an electronic device for managing a screen displayed on a deformable display and an operation method in the electronic device.

Description of Related Art

Electronic devices have been developed for the convenience of users in various ways and provide various services or functions. An electronic device may include various applications for executing various services or functions. Since applications are executed in a software module such as an operating system of a program, the electronic device may provide a program that displays objects representing executable applications on a screen such as a home screen displayed on a display so that a user may easily access the executable applications, and executes the executable applications.

The electronic device may provide a multi-display environment to display execution of various services or functions and include a display deformable into various shapes and a plurality of displays. Various technologies for configuring a screen for displaying objects representing executable applications in the electronic device have been developed.

When a conventional electronic device manages a screen, a display is deformed into various shapes or the different layouts are set for screens by a plurality of displays having different sizes. Therefore, it may be difficult to provide uniform screens.

In an electronic device, an image or characters which are displayed in the layout of some directly uncontrollable application may be broken or cropped, although displayed on a screen by a screen management program (or module). Accordingly, it may be difficult to provide a view suitable for the situation of the screen.

SUMMARY

Embodiments of the disclosure provide an electronic device for managing a screen displayed on a deformable display to provide a view suitable for the situation of a screen, and an operation method in the electronic device may be provided.

According to an example embodiment of the disclosure, an electronic device may include: a display module including a display configured to be deformable, a memory, and at least one processor electrically coupled to the display module and the memory. The at least one processor may be configured to: obtain first state information related to a screen for displaying objects of execution applications, obtain second state information related to deformation of the display, generate a view of a mini-application executable on the screen based on the first state information and the second state information, and control the display module to display the screen configured to include the generated view of the mini-application in a display area visible to the outside based on the deformation of the display.

According to an example embodiment, a method of operating an electronic device may include: obtaining first state information related to a screen for displaying objects of execution applications, obtaining second state information related to deformation of a display included in a display module of the electronic device, generating a view of a mini-application executable on the screen based on the first state information and the second state information, and displaying the screen configured to include the generated view of the mini-application in a display area visible to the outside based on the deformation of the display.

According to an example embodiment, an electronic device may configure a mini-application (e.g., widget) view based on information related to the state of a deformable display and information related to the state of a home screen, and display a screen including the configured view in a display area visible to the outside based on the deformation of the display, thereby providing a view suitable for the situation of the screen.

Further, according to an example embodiment, when the electronic device displays a home screen configured in a portrait layout by rotation in a landscape mode, the electronic device may reconfigure a widget view in response to the portrait layout. Therefore, the visibility of the layout of the widget view may be improved, and breakage or crop of the widget view may be overcome.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may be used to denote the same or similar components.

DETAILED DESCRIPTION

An electronic device according to various example embodiments will be described in greater detail below with reference to the attached drawings. The term 'user' as used in various embodiments may refer to a person using an electronic device or a device (e.g., artificial intelligence electronic device) using an electronic device.

Figure 1:
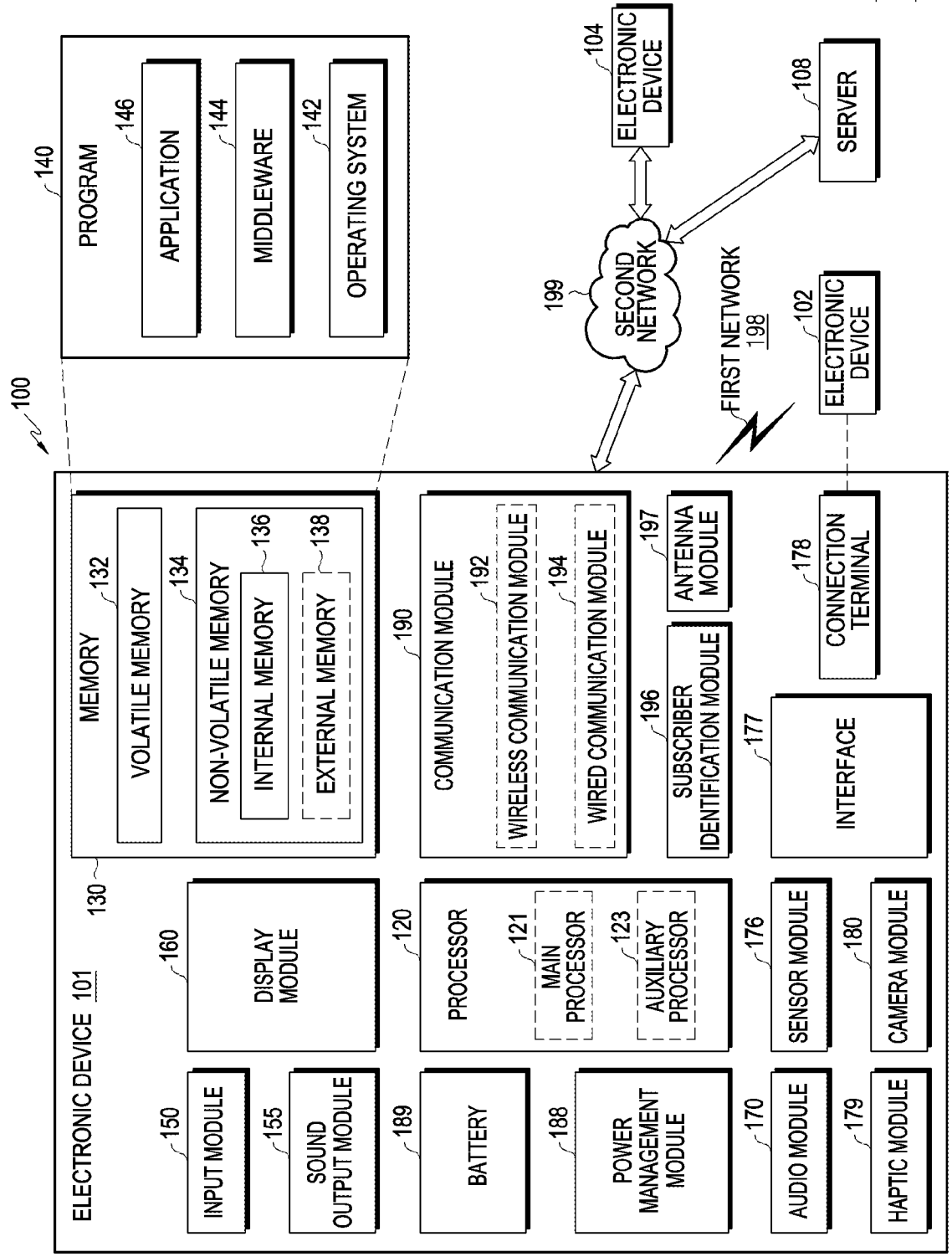
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
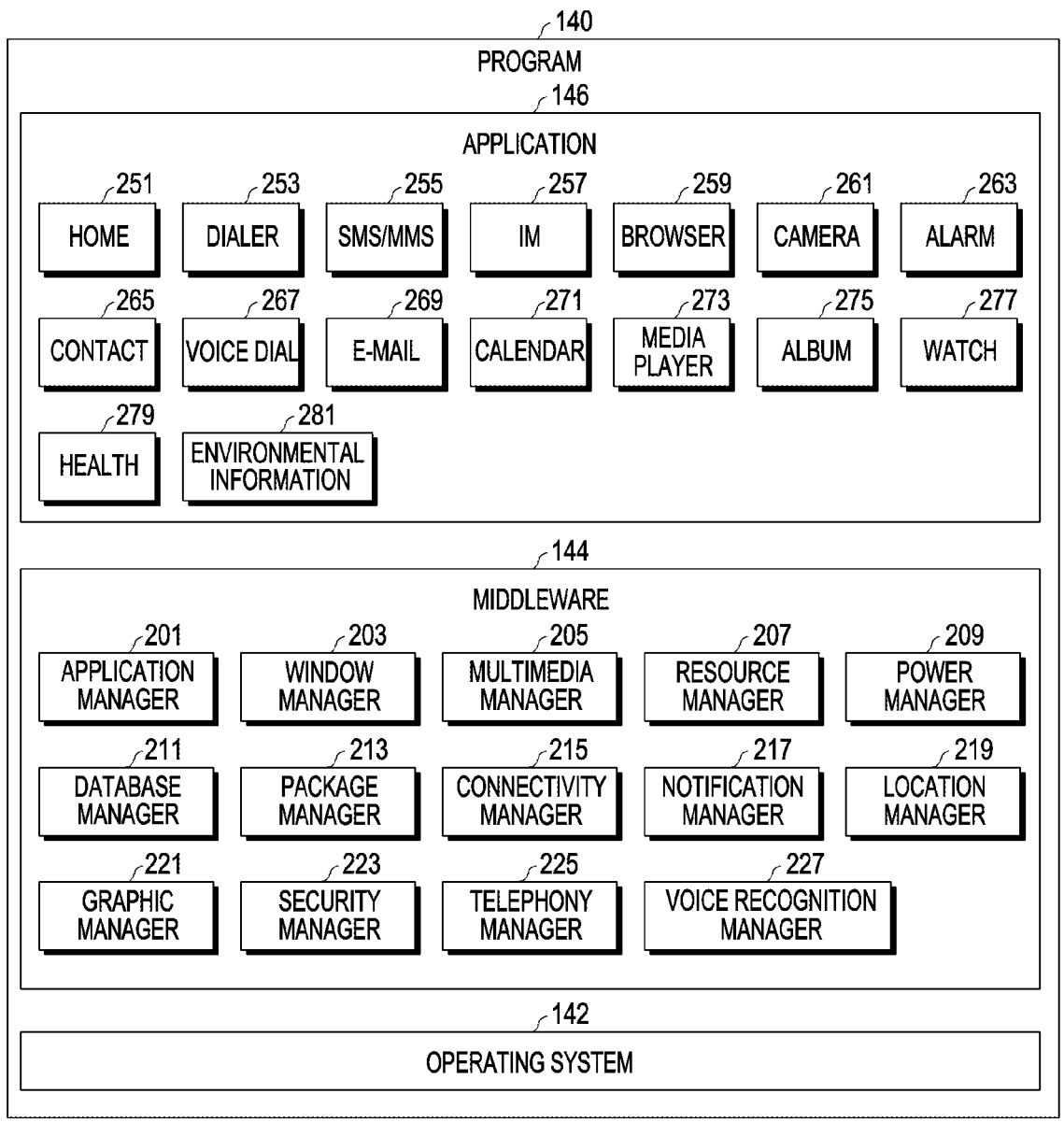
FIG. 2 is a block diagram illustrating an example program according to an embodiments.

FIG. 2 is a block diagram 200 illustrating an example program 140 according to an embodiment.

According to an embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based on corresponding information of the capacity, temperature, and power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage position information about the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3A:
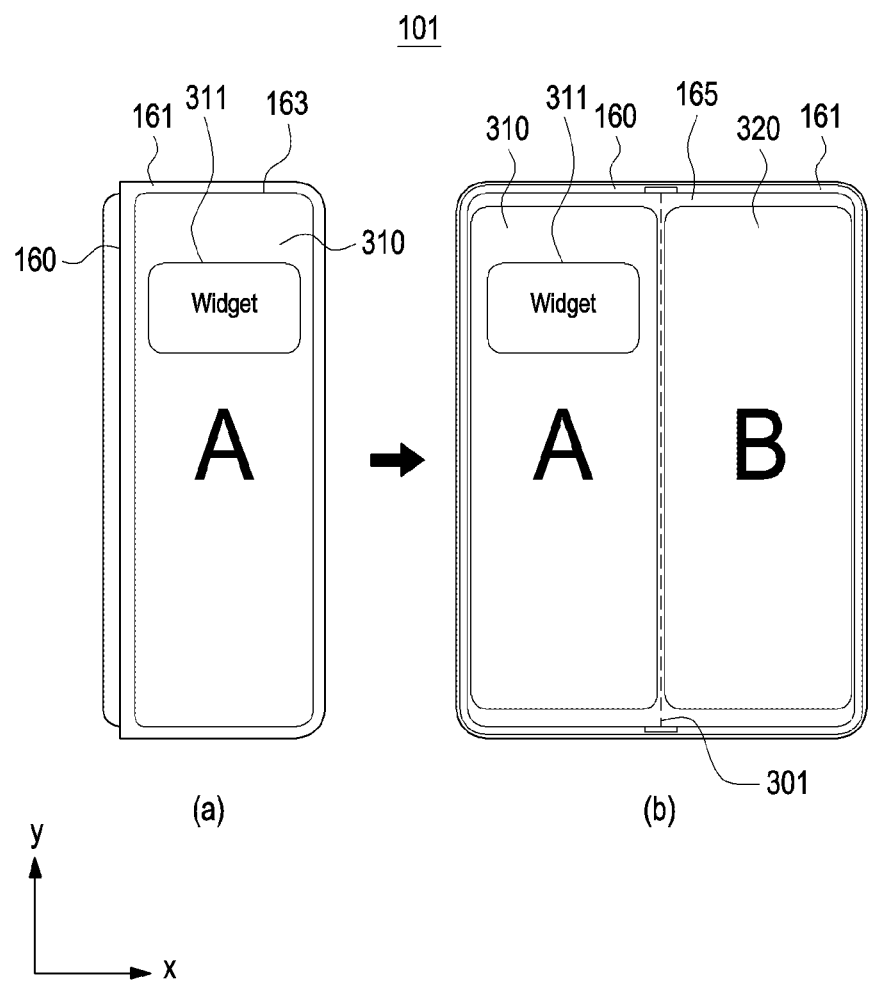
FIGS. 3A, 3B, and 3C are diagrams illustrating example configurations of an electronic device according to an embodiment.
Figure 3B:
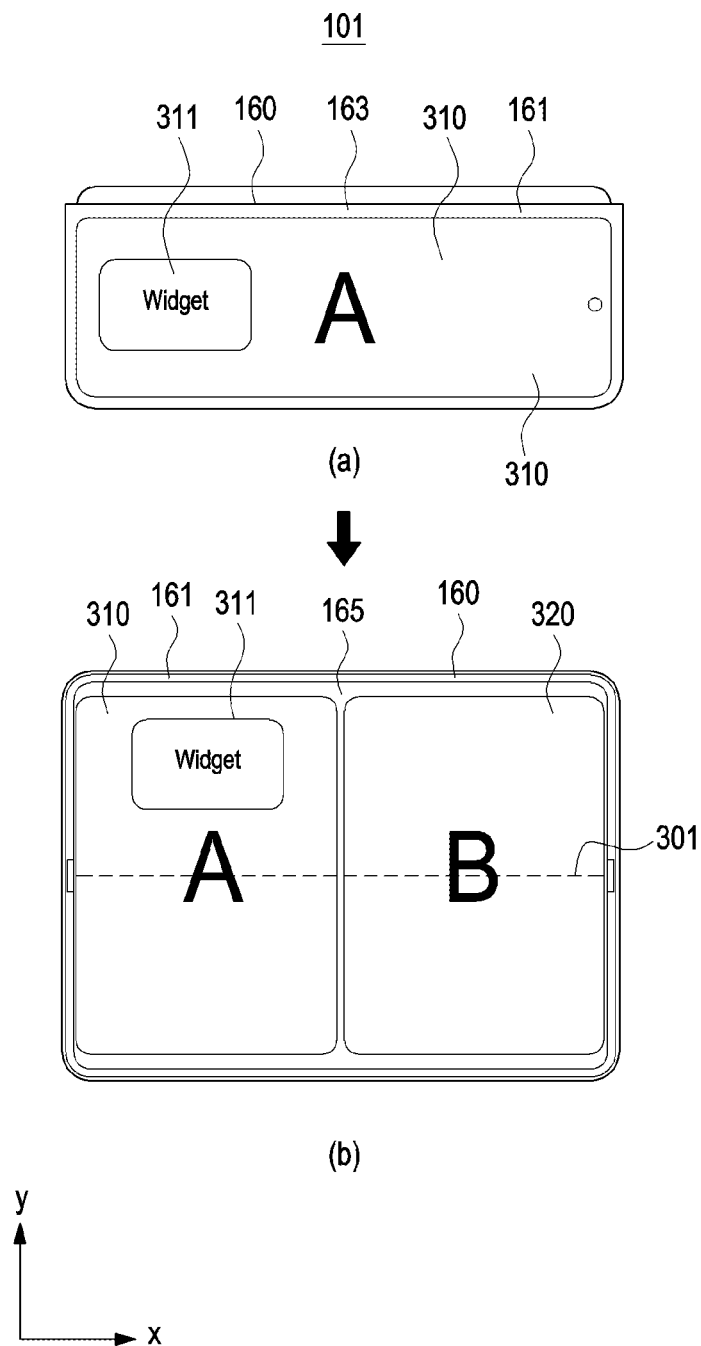
Figure 3C:
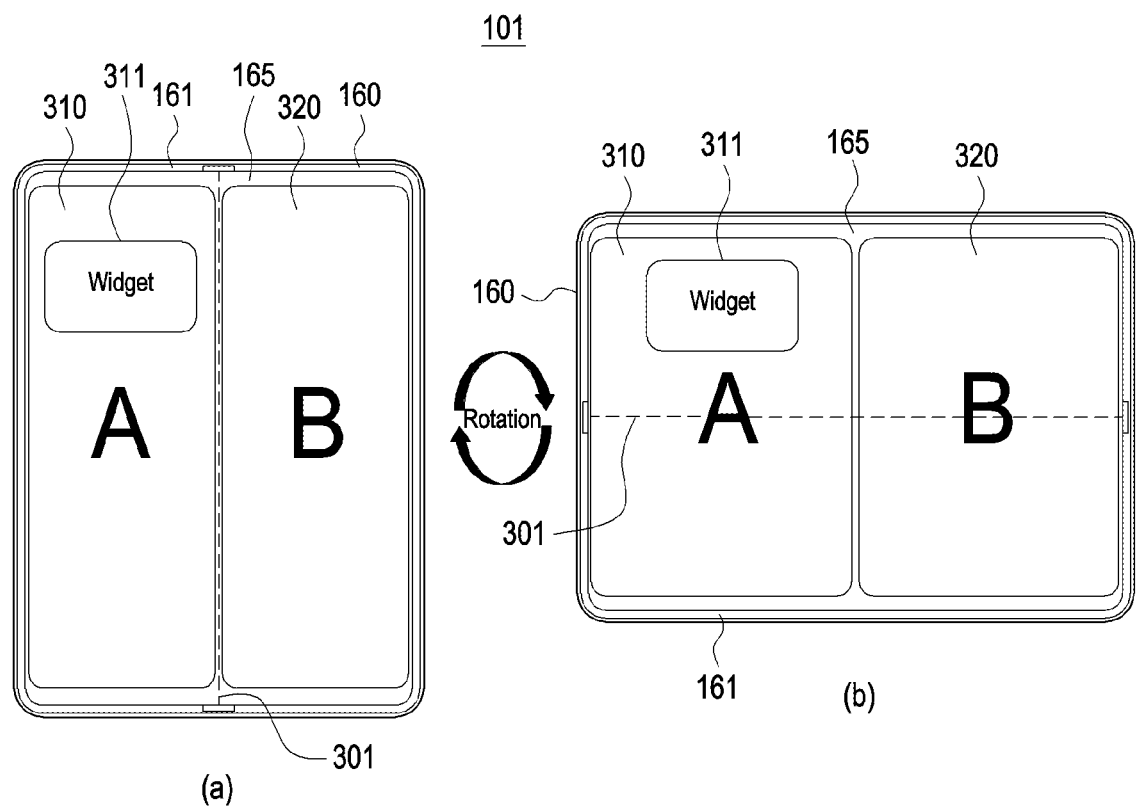

FIGS. 3A, 3B, and 3C are diagrams illustrating example configurations of an electronic device according to an embodiment. The example configurations of the electronic device will be described with reference to FIGS. 1, 2, 3A, 3B, and 3C.

According to an embodiment, the electronic device 101 (the electronic device 101 of FIGS. 1 and 2) may include the display module 160 including a deformable display and the at least one processor (e.g., including processing circuitry) 120 (e.g., the processor 120 of FIG. 1) electrically coupled to the display module 160. The electronic device 101 may include the memory 130 (e.g., the memory 130 of FIG. 1 or the program 140 of FIGS. 1 and 2) storing instructions that, when executed, cause the at least one processor 120 to perform operations for screen management. For example, the electronic device 101 may be configured in a foldable, slidable, or rollable form so that the display is deformable.

The electronic device 101 may be configured in other forms that enable deformation of the display, not limited to the above-described forms.

According to an embodiment, as illustrated in FIGS. 3A and 3B, the electronic device 101 may be configured such that the display 161 included in the display module 160 is deformed to extend from a first display area 163 to a second display area 165 according to a change in the state of the electronic device 101. For example, when the electronic device 101 is in a first state (e.g., folded state), the electronic device 101 may deform the display 161 to make visible the first display area 163 to the outside. For example, when the electronic device 101 is in a second state (e.g., unfolded state), the electronic device 101 may deform the display 161 to make visible the second display area 165 to the outside. The second display area 165 may be an extension of the area visible to the outside from the first display area 163.

According to an embodiment, the at least one processor 120 of the electronic device 101 may control the display module 160 to display a screen (e.g., at least one of a home screen, a lock screen, a pop-up window, or multiple windows) based on the state of the electronic device 101, as illustrated in FIGS. 3A and 3B. In the following description, the screen will be described in the context of a home screen, by way of example. The home screen (or start screen) may be configured to include at least one first object (e.g., a widget view or an appwidget host view) indicating a mini-application (e.g., widget) executable on the home screen and at least one second object (e.g., execution icon) representing at least one application. The home screen may be managed by a screen management module (e.g., application, program, service, or function for screen management) included in a software module (e.g., the program 140 of FIGS. 1 and 2) (not shown) of the electronic device 101. The mini-application (e.g., widget) may be configured to execute, on the home screen, at least one accessible function provided by a service module (not shown) included in the software module (e.g., the program 140 of FIGS. 1 and 2) of the electronic device 101 by the screen management module for managing the home screen. A mini-application view (e.g., widget view or appwidget host view) may include an object representing information obtained according to execution of at least one function.

According to an embodiment, when the electronic device 101 is in the first state (e.g., folded state), the electronic device 101 may control the display module 160 to display a first screen A 310 in the first display area 163 on the home screen corresponding to the first state. When a plurality of screens are to be displayed in the first display area 163, that is, a home screen is configured with a plurality of pages in the first state, the at least one processor 120 may control the display module 160 to display a second screen B (not shown) of the home screen hidden on the next page in the first display area 163 and hide the first screen A 310, according to a gesture input (e.g., swipe). When the electronic device 101 is in the second state (e.g., unfolded state), the at least one processor 120 may control the display module 160 to display the first screen A 310 and the second screen B 320 as home screens corresponding to the second state in the second display area 165. When there is a hidden screen (not shown) in addition to the first screen A 310 and the second screen B 320 corresponding to the second state, the at least one processor 120 may control the display module 160 to hide some of the displayed first screen A 310 and the second screen B 320 and display the additional hidden screen in the second display area 165, according to a specified gesture input (e.g., swipe) in the second state.

According to an embodiment, when a portrait mode is set, the at least one processor 120 may control the display module 160 to display the home screen (e.g., the screen A, the screen B, or the screens A and B) in a portrait layout by the screen management module (e.g., launcher), as illustrated in FIG. 3A. The portrait mode may be set such that they axis of the display 161 is longer than the x axis of the display 161 in the state where the electronic device 101 is folded or unfolded with respect to a reference line 301. The first screen A 310 and/or the second screen B 320 of the home screen may be configured in the portrait layout to be displayed in parallel to the reference line 301 in the portrait mode.

According to an embodiment, when a landscape mode is set, the at least one processor 120 may control the display module 160 to display the home screen (e.g., the screen A, the screen B, or the screens A and B) in the portrait layout by the screen management module (e.g., launcher), as illustrated in FIG. 3B. The landscape mode may be set such that the x axis of the display 161 is longer than the y axis of the display 161 in the folded or unfolded state of the electronic device 101 with respect to the reference line 301. The first screen A 310 and/or the second screen B 320 of the home screen may be configured in the portrait layout to be displayed perpendicularly to the reference line 301 in the landscape mode.

According to an embodiment, the at least one processor 120 may control the display module 160 to switch from the landscape mode to the portrait mode along with clockwise rotation of the electronic device 101, as illustrated in FIG. 3C. The at least one processor 120 may control the display module 160 to switch from the portrait mode to the landscape mode by rotating in a clockwise or counterclockwise direction. The landscape mode may be set such that the x axis of the display 161 is longer than the y axis of the display 161 in the folded or unfolded state of the electronic device 101 with respect to the reference line 301, and the portrait mode may be set such that the y axis of the display 161 is longer than the x axis of the display 161 in the folded or unfolded state of the electronic device 101 with respect to the reference line 301.

According to an embodiment, as illustrated in FIGS. 3A and 3C, the first processor 120 may be configured to separately display the first screen A 310 and the second screen B 320 with respect to the reference line 301 in the unfolded state in the portrait mode. For example, the first screen A 310 may include a mini-application (e.g., widget) 311 that executes some functions by the screen management module.

According to an embodiment, as illustrated in FIGS. 3B and 3C, the at least one processor 120 may display a part of each of the first screen A 310 and the second screen B 320 in an area above the reference line 301 and the other part of each of the first screen A 310 and the second screen B 320 in an area below the reference line 301, in the unfolded state in the landscape mode. For example, the first screen A 310 may include the mini-application (e.g., widget) 311 that executes some functions on the home screen by the screen management module (e.g., launcher).

According to an embodiment, the at least one processor 120 may obtain first state information related to the state of the home screen in response to execution of an application related to home screen management. The at least one processor 120 may obtain second state information related to deformation of the display 161. The first state information may include information (e.g., information related to a synchronization mode, a dark mode, and/or a default cell height) related to the state of the home screen, set by the screen management module. For example, the at least one processor 120 may identify whether the state of the home screen is an active state (sync on) or inactive state (sync off) of the synchronization mode based on the obtained first state information. The second state information, which is information related to the state of the electronic device 101, may include information indicating the folded or unfolded state of the electronic device 101 and information indicating the portrait mode or landscape mode of the display. For example, the at least one processor 120 may identify whether the electronic device 101 is folded or unfolded using at least one sensor (e.g., the sensor module 176 of FIG. 1).

According to an embodiment, the at least one processor 120 may configure display attributes (or layout) of the view (e.g., appwidget host view) of the mini-application 311 executable on the home screen based on the first state information and the second state information. The view of the mini-application 311 may include an object representing information related to at least one function.

According to an embodiment, the at least one processor 120 may control the display module 160 to display a home screen configured to include the generated view of the application 311 in the first display area 163 or the second display area 165 that is visible to the outside according to deformation of the display 161. When identifying that the display 161 has been deformed to shrink, the at least one processor 120 may set or change first display attributes in response to visual exposure of the first display area 163 to the outside from the display 161. The at least one processor 120 may control the display module 160 to display a home screen configured based on the first display attributes in the first display area 163.

According to an embodiment, when identifying that screen synchronization is inactive and the display 161 has been deformed to extend based on the first state information, the at least one processor 120 may set or change second display attributes different from the first display attributes in response to visual exposure of the second display area 165 to the outside from the display 161. When identifying that screen synchronization is active and the display 161 has been deformed to extend based on the first state information, the at least one processor 120 may set or change the second display attributes corresponding to the second display area 165 in synchronization with the first display attributes. The at least one processor 120 may control the display module 160 to display the home screen in the second display area 165 based on the second display attributes.

According to an embodiment, the at least one processor 120 may identify whether the display 161 is in the landscape mode or the portrait mode based on the second state information, and change the display attributes of the view of the mini-application 311 in response to the landscape mode or the portrait mode.

According to an embodiment, the at least one processor 120 may identify activation of the dark mode based on the first state information.

According to an embodiment, the at least one processor 120 may darken the home screen by changing a brightness attribute of the home screen to a specified value based on dark mode-related information included in the first state information, and change at least one of the brightness attribute or color attribute of the view of the mini-application 311. The at least one processor 120 may control the display module 160 to display the view of the mini-application 311 which has been changed according to the deformation of the display 161 by changing the display attributes of the view of the mini-application 311 in response to a change in a default cell height during the deformation of the display 161 based on information related to the change in the default cell height included in the first state information.

According to an embodiment, when the state of the home screen is changed, the display 161 is deformed, or information obtained by execution of at least one function of the mini-application 311 is updated, the at least one processor 120 may re-generate the view of the mini-application 311 and reconfigure the home screen including the re-generated view of the mini-application. For example, as the synchronization mode is activated, the at least one processor 120 may re-load and bind all of execution objects and/or widgets to be included in the home screen by re-executing an activity of the application related to screen management by the screen management module.

According to an embodiment, the at least one processor 120 may execute the application related to home screen management to configure information related to the state of the home screen included in the first state information. For example, the at least one processor 120 may configure whether the synchronization mode is activated or deactivated, display attributes (or layout) of the home screen, objects displayed on the home screen, addition of a new screen, or other information related to configuration of the home screen. The synchronization mode may be a function to display, in the second display area 165, a home screen synchronized with a home screen displayed in the first display area 163 in the shrunken state (e.g., folded state), when the home screen is displayed in the second display area 165 in the extended state (e.g., unfolded state) placed by deformation of the display.

Figure 4A:
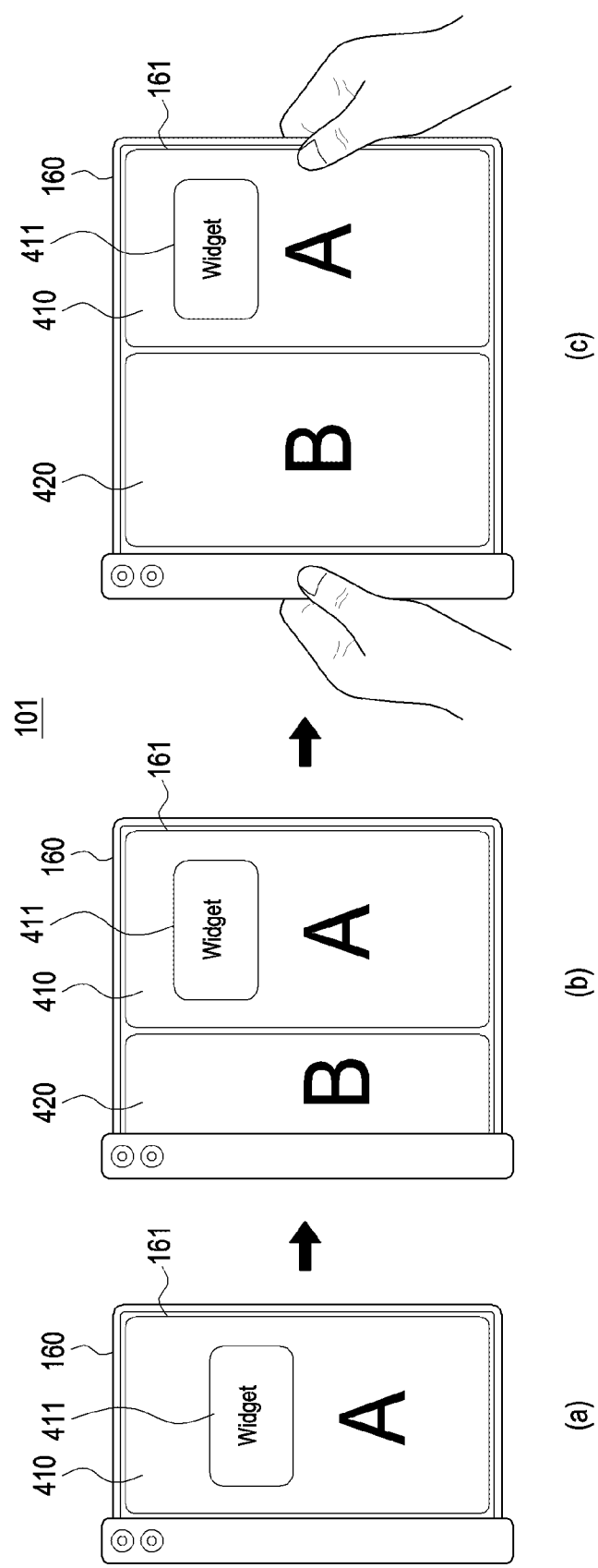
FIGS. 4A and 4B are diagrams illustrating example configurations of an electronic device according to an embodiment.
Figure 4B:
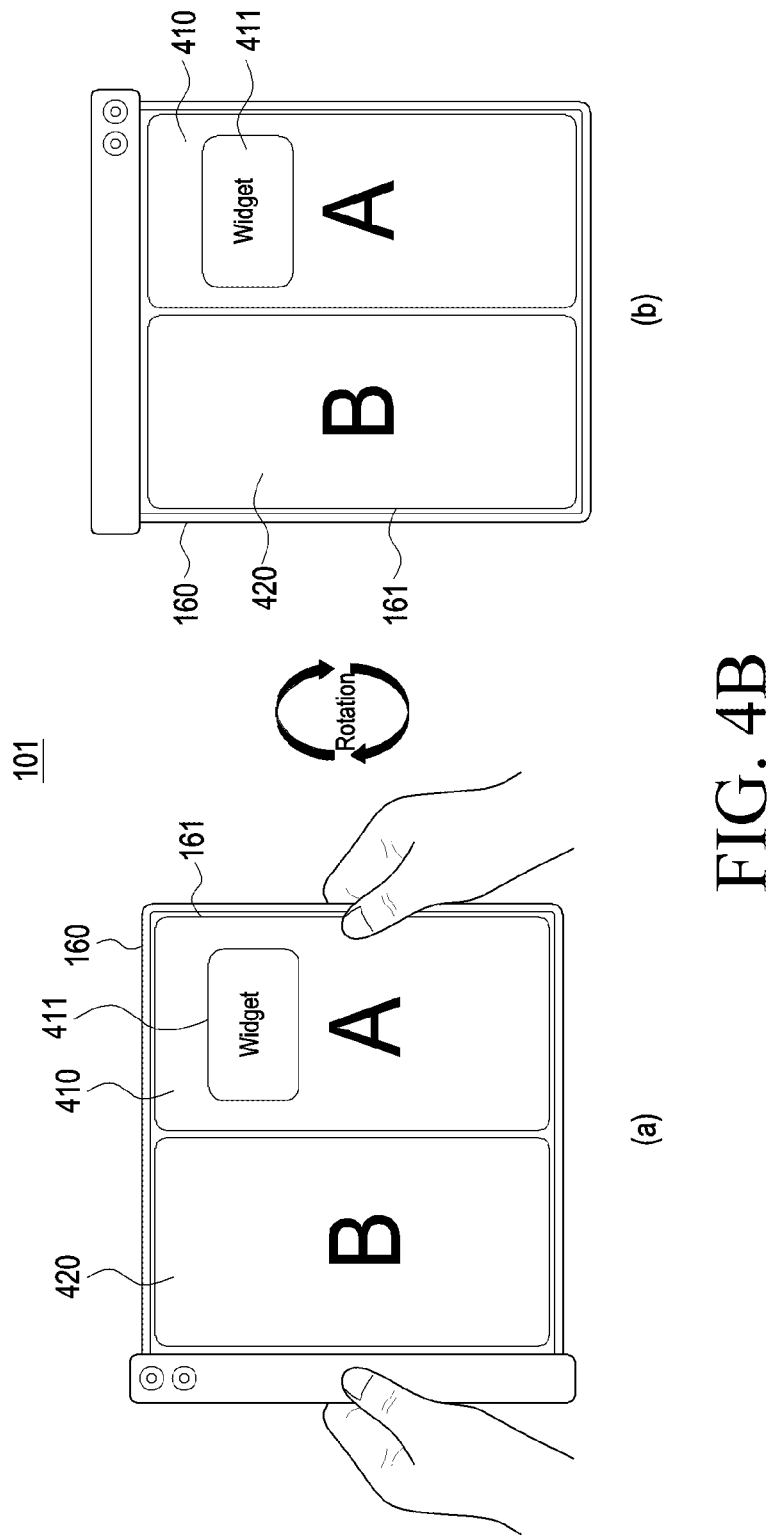

FIGS. 4A and 4B are diagrams illustrating example configurations of an electronic device according to an embodiment.

Referring to FIGS. 1, 2, 4A, and 4B, the electronic device 101 (e.g., the electronic device 101 of FIGS. 1 and 2) according to an embodiment may include the display module 160 configured to deform the display 161 according to sliding or rolling. The at least one processor 120 of the electronic device 101 may control the display module 160 to extend an area of the display 161 visible to the outside in a sliding or rolling direction, as illustrated in (a), (b) and (c) of FIG. 4A. The at least one processor 120 may control the display module 160 to display a first screen A 410 and a second screen B 420 of a home screen in response to rotation of the electronic device 101, switch to the portrait mode by clockwise rotation in the landscape mode, and display the first screen A 410 and the second screen B 420 in response to the portrait mode, as illustrated in (a) and (b) of FIG. 4B. The at least one processor 120 may include a mini-application (e.g., widget) 411 that executes some functions on the home screen, in the first screen A 410 of the home screen.

Figure 5:
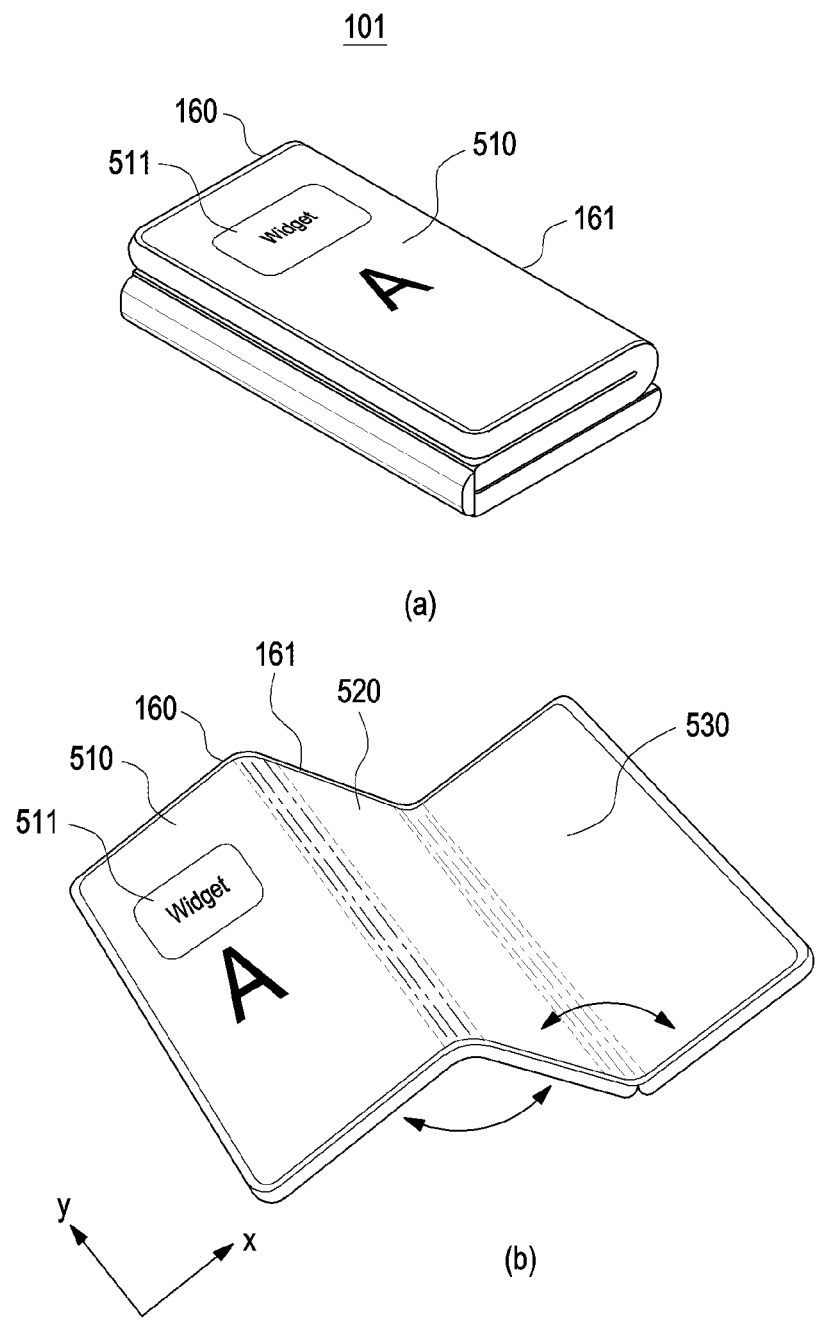
FIG. 5 is a diagram illustrating an example configuration of an electronic device according to an embodiment.

FIG. 5 is a diagram illustrating an example configuration of an electronic device according to an embodiment.

Referring to FIGS. 1, 2, and 5, the electronic device 101 (e.g., the electronic device 101 of FIGS. 1 and 2) according to an embodiment may include the display module 160 configured to deform the display 161 according to multiple foldings (e.g., a z folder). The at least one processor 120 of the electronic device 101 may control the display module 160 to extend an area of the display 161 visible to the outside according to unfolding, as illustrated in (a) and (b) of FIG. 5. As illustrated in (a) of FIG. 5, the at least one processor 120 may display a first screen A 510 of the home screen in response to the folded state, and as illustrated in (b) of FIG. 5, the at least one processor 120 may display screens 510, 520, and 530 of the home screen in the visible area of the display 161 in response to the unfolded state. When the screens 510, 520, and 530 are visible to the outside, the visible area may extend in an x-axis direction, and thus the x axis becomes longer than the y axis. Accordingly, the at least one processor 120 may configure the home screen in the landscape layout. The at least one processor 120 may include, in the first screen A 510, a mini-application (e.g., widget) 511 that executes some functions on the home screen by the screen management module (e.g., launcher).

Referring to FIGS. 1 and 2, the electronic device 101 (e.g., the electronic device 101 of FIG. 1) according to an embodiment may implement a software module (e.g., the program 140 of FIGS. 1 and 2) related to screen (e.g., home screen) management. The memory 130 of the electronic device 101 may store instructions to implement the software module. The at least one processor 120 may execute the instructions stored in the memory 130 to implement the software module and control hardware (e.g., the sensor module 176, the display module 160, or the communication module 190 of FIG. 1) associated with the functions of the software module. The software module may include a screen management module (e.g., program, application, service, or function) for screen (e.g., home screen) management, and a service module that manages applications of objects (e.g., execution icons) displayed on a screen and/or a mini-application (e.g., widget), and provides functions of the applications and/or the mini-application. The screen management module, which may include a program included in the software module (e.g., the program 140 of FIGS. 1 and 2) of the electronic device, may be a program capable of embedding a widget (e.g., web widget). The service module, which may include a program included in the software module of the electronic device, may be a program (or manager) responsible for communication between the screen management module and an application that provides information displayed in a widget, and a layout of the widget.

Main components of an electronic device have been described in the context of the electronic device 101 of FIGS. 1 and 2 in an example embodiment. However, in various embodiments, all of the components illustrated in FIGS. 1 and 2 are not required, and the electronic device 101 may be implemented with more components or fewer components than the illustrated components. Further, the positions of the main components of the electronic device 101 described with reference to FIGS. 1 and 2 may be changed according to various embodiments.

According to an example embodiment, an electronic device (e.g., the electronic device 101 of FIGS. 1, 2, 3A, 3B, 3C, 4A, 4B, and 5) may include: a display module (e.g., the display module 160 of FIGS. 1, 3A, 3B, 3C, 4A, 4B, and 5) including a display (e.g., the display 161 of FIGS. 3A, 3B, 3C, 4A, 4B, and 5) configured to be deformable, a memory (e.g., the memory 130 of FIG. 1), and at least one processor (e.g., the processor 120 of FIG. 1) electrically coupled to the display module and the memory. The at least one processor may be configured to: obtain first state information related to a screen (e.g., a default screen, a start screen, or a home screen) configured to display objects of execution applications, obtain second state information related to deformation of the display, generate a view of a mini-application executable on the screen based on the first state information and the second state information, and control the display module to display the screen configured to include the generated view of the mini-application in a display area visible to the outside based on the deformation of the display.

According to an example embodiment, the at least one processor may be configured to: based on a state of the screen being changed, the display being deformed, or information obtained by execution of at least one function of the mini-application being updated, re-generate the view of the mini-application and reconfigure the screen including the re-generated view of the mini-application.

According to an example embodiment, the mini-application may be configured to execute the at least one function which is accessible, provided by a service module on the screen by a screen management module configured to manage the screen. The view of the mini-application may include an object representing the information obtained by execution of the at least one function.

According to an embodiment, the at least one processor may be configured to: identify the deformation of the display based on information detected by at least one sensor based on the display being deformed to shrink, set first display attributes corresponding to a first display area visible to the outside based on deformation of the display, and control the display module to display the screen in the first display area based on the first display attributes.

According to an example embodiment, the at least one processor may be configured to: identify an inactive state of screen synchronization based on the first state information based on the display being deformed to extend, set second display attributes corresponding to a second display area visible to the outside based on deformation of the display, and control the display module to display the screen in the second display area based on the second display attributes. The second display attributes may be set to be different from the first display attributes.

According to an example embodiment, the at least one processor may be configured to: identify an active state of screen synchronization based on the first state information based on the display being deformed to extend, set second display attributes corresponding to a second display area in synchronization with the first display attributes, and control the display module to display the screen in the second display area based on the second display attributes.

According to an example embodiment, the at least one processor may be configured to: based on the screen displayed in the first display area being configured with a plurality of pages, identify a number of pages to be displayed in a second display area corresponding to a layout of the first display area, and control the display module to display a part of the plurality of pages in the second display area, and hide another part of the plurality of pages, based on the identified number of pages.

According to an example embodiment, the at least one processor may be configured to: identify a state of the display based on rotation of the electronic device based on the second state information, based on the state of the display being identified as switched from a portrait mode to a landscape mode, change first display attributes or second display attributes to display the screen in a vertical direction with respect to a reference line, and change display attributes of the view of the mini-application to display the view of the mini-application included in the screen in the vertical direction.

According to an example embodiment, the at least one processor may be configured to: identify a state of the display based on rotation of the electronic device based on the second state information, based on the state of the display being identified as switched from a landscape mode to a portrait mode, change first display attributes or second display attributes to display the screen in a horizontal direction with respect to a reference line, and change display attributes of the view of the mini-application to display the view of the mini-application included in the screen in the horizontal direction.

According to an example embodiment, the at least one processor may be configured to: identify activation of a dark mode based on the first state information, change a brightness attribute of the screen to a specified value to darken the screen, and based on the brightness attribute of the screen being changed, change at least one of a brightness attribute or a color attribute of the view of the mini-application.

A description will be given of an example method of performing an operation of managing a screen displayed on a display in the electronic device described before with reference to the foregoing drawings (e.g., FIGS. 1, 2, 3A, 3B, 3C, 4A, 4B, and 5). In the following description, a home screen will be taken as an example of a screen. The home screen (e.g., start screen) may be configured to include a first object (e.g., widget) indicating a mini-application (e.g., widget) executable on the home screen and a second object (e.g., execution icon) representing at least one application.

Figure 6:
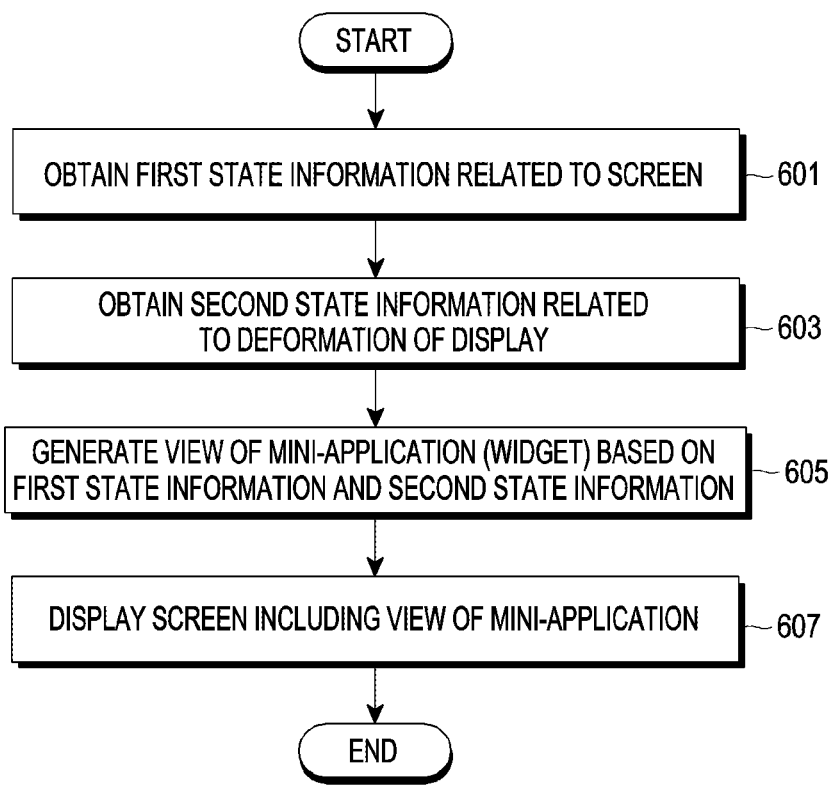
FIG. 6 is a flowchart illustrating an example method of operating an electronic device according to an embodiment.

FIG. 6 is a flowchart illustrating an example method of operating an electronic device according to an embodiment.

Referring to FIG. 6, the electronic device (e.g., the electronic device 101 of FIGS. 1 and 2) according to an embodiment may obtain first state information related to a home screen configured by a screen management module (e.g., launcher) for managing the home screen (the home screen will be taken as an example hereinbelow) in response to execution of an application related to screen management in operation 601. The first state information may include information related to a state of the home screen configured by the screen management module (e.g., synchronization mode information, dark mode information, and/or default cell information (e.g., a default cell width/height). For example, the electronic device 101 may identify whether the home screen is in a sync on state or a sync off state based on the obtained first state information.

In operation 603, the electronic device 101 may obtain second state information related to deformation of a display. The second state information, which is information related to a state of the electronic device 101, may include information indicating the folded or unfolded state of the electronic device and information indicating the landscape mode or portrait mode of the display. For example, the electronic device 101 may identify whether the electronic device 101 has been folded or unfolded, using at least one sensor.

In operation 605, the electronic device 101 may generate a view (e.g., appwidget host view) of a mini-application executable on the home screen by configuring display attributes (or layout) of the view of the mini-application based on the first state information and the second state information. The view of the mini-application may include an object representing information related to at least one execution function, and may be displayed in a part of the home screen displayed in a display area (e.g., the first display area 163 of FIGS. 3A and 3B or the second display area 165 of FIGS. 3A, 3B, and 3C) changed in response to deformation of the display.

In operation 607, the electronic device 101 may display a screen including the changed view of the mini-application in a display area visually exposed to the outside in response to the deformation of the display.

Figure 7:
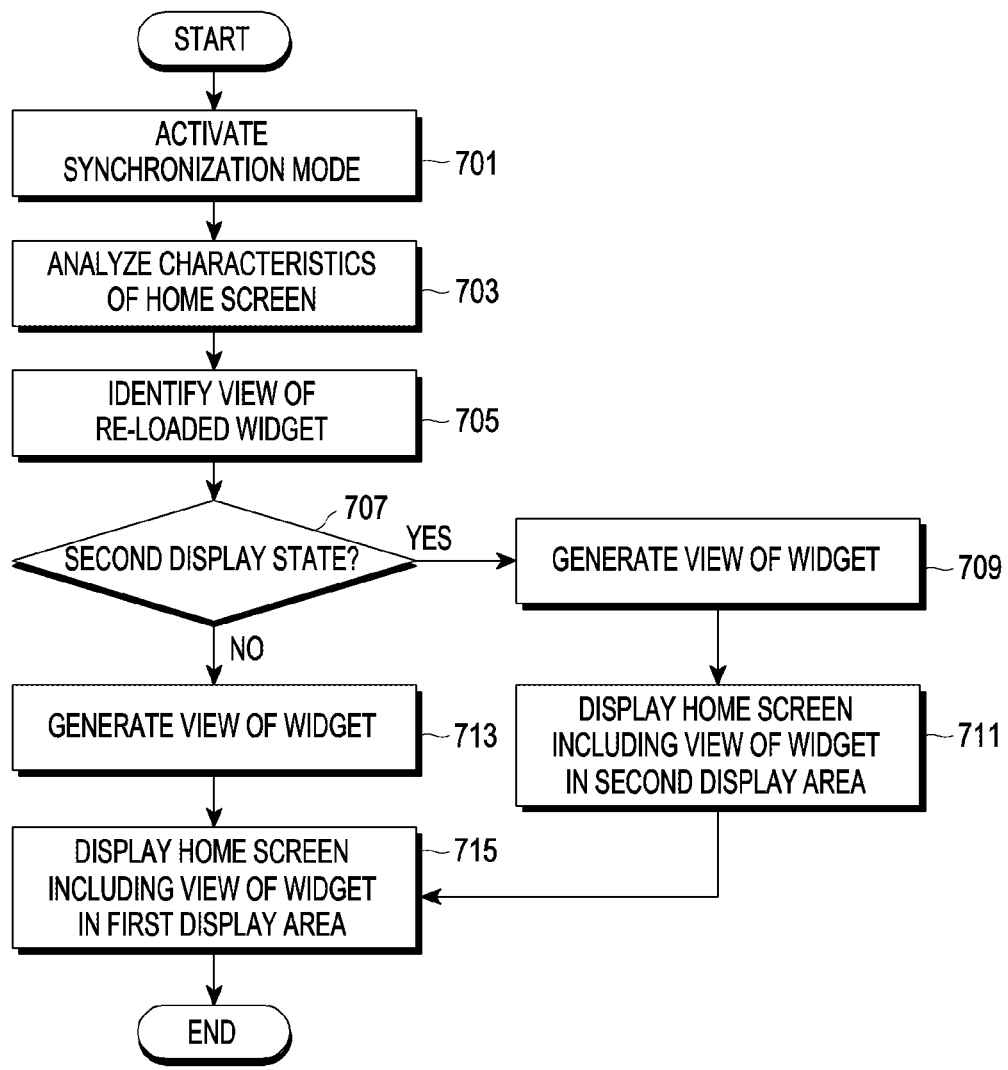
FIG. 7 is a flowchart illustrating an example method of operating an electronic device according to an embodiment.

FIG. 7 is a flowchart illustrating an example method of operating an electronic device according to an embodiment.

Referring to FIG. 7, an electronic device (e.g., the electronic device 101 of FIGS. 1 and 2) may activate a synchronization mode by executing an application related to home screen management in operation 701.

In operation 703, the electronic device 101 may analyze the characteristics of a home screen based on first state information in the sync on state. For example, as the synchronization mode transitions to the sync on state, the activity of a screen management mode is re-made, and thus the electronic device 101 may re-load or bind all of execution objects and/or widgets to be included in the home screen. The electronic device 101 may analyze the characteristics of the home screen to identify whether there is a mini-application view (or appwidget host view) or layout uncontrollable by a screen management module that manages the home screen.

In operation 705, the electronic device 101 may identify the view (or layout) of at least one widget re-loaded on the home screen configured to be displayed in a first display area corresponding to the sync on state. The layout of the widget view may be configured in a form that shows information related to at least one function of an application directly accessible on the home screen (e.g., view at a glance). The widget view may be a view (e.g., appwidget host view) uncontrollable in the screen management module, and generation (or change) of the view or layout of the widget may be requested from the service module (e.g., appwidget service). Information about a layout attribute of the widget and information about at least one function of the widget may be managed in the service module (e.g., appwidget service), and the view of the widget may be executed and displayed on the display by the screen management module (e.g., appwidget host). For example, whenever a new home screen is started and a widget needs to be displayed, the screen management module may generate a view (e.g., appwidget host view) corresponding to a wrapped frame and request binding of the generated view from the service module. The screen management module, which is a program included in a software module (e.g., the program 140 of FIGS. 1 and 2) of the electronic device, may be a program in which a widget (or web widget) may be embedded. The service module, which is a program included in the software module of the electronic device, may be a program (or manager) responsible for communication between the screen management module and an application that provides information displayed in a widget and display attributes (or layout) of the widget.

In operation 707, the electronic device 101 may identify whether the display is in a second display state in which the display is deformed to extend according to deformation of the display of the electronic device based on obtained second state information. In the case of the second display state (e.g., unfolded state) as a result of the identification (operation 707—'Yes'), the electronic device 101 may perform operation 709. When the display is in a first display state in which the display is deformed to shrink (e.g., folded state) (operation 707—'No'), the electronic device 101 may perform operation 713.

In operation 709, when the display is in the second display state in which the display is deformed to extend, the electronic device 101 may generate a view of at least one widget based on the first state information and the second state information. The electronic device 101 may generate the view of the at least one widget by configuring display attributes (or layout) of the view of the at least one widget based on the first state information and the second state information. The electronic device 101 may identify the landscape mode or portrait mode of the display to display a home screen based on the second state information. In the landscape mode, the electronic device 101 may configure the view of the widget included in the home screen in the landscape layout, and in the portrait mode, the electronic device 101 may configure the view of the widget included in the home screen in the portrait layout, to inflate the configured view of the widget on the home screen.

In operation 711, the electronic device 101 may display the home screen reconfigured by inflating the generated view of the at least one widget, in the second display area.

In operation 713, when the display is in the first display state, the electronic device 101 may generate a view of the at least one widget based on the first state information and the second state information. The electronic device 101 may identify the landscape mode or portrait mode of the display to display a home screen based on the second state information. In the landscape mode, the electronic device 101 may configure the view of the widget included in the home screen in the landscape layout, and in the portrait mode, the electronic device 101 may configure the view of the widget included in the home screen in the portrait layout, to inflate the configured view of the widget on the home screen. The electronic device 101 may identify the portrait mode of the display, configure the view of the widget included in the home screen in the portrait layout in response to the portrait mode, and inflate the configured view of the d widget on the home screen.

In operation 715, the electronic device 101 may display the home screen reconfigured by inflating the generated view of the at least one widget, in the first display area.

Figure 8:
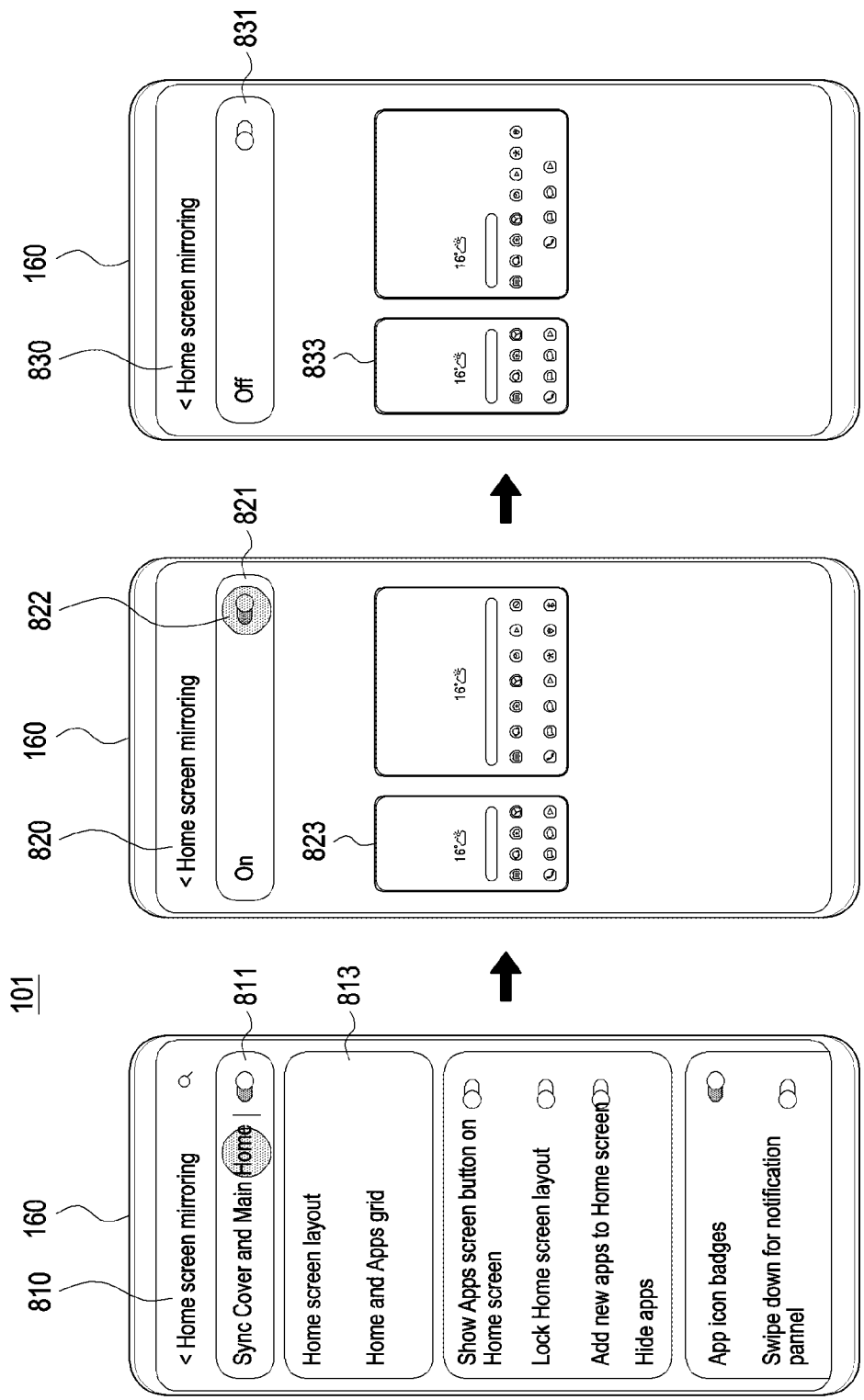
FIG. 8 is a diagram illustrating an example method of operating an electronic device according to an embodiment.
Figure 9:
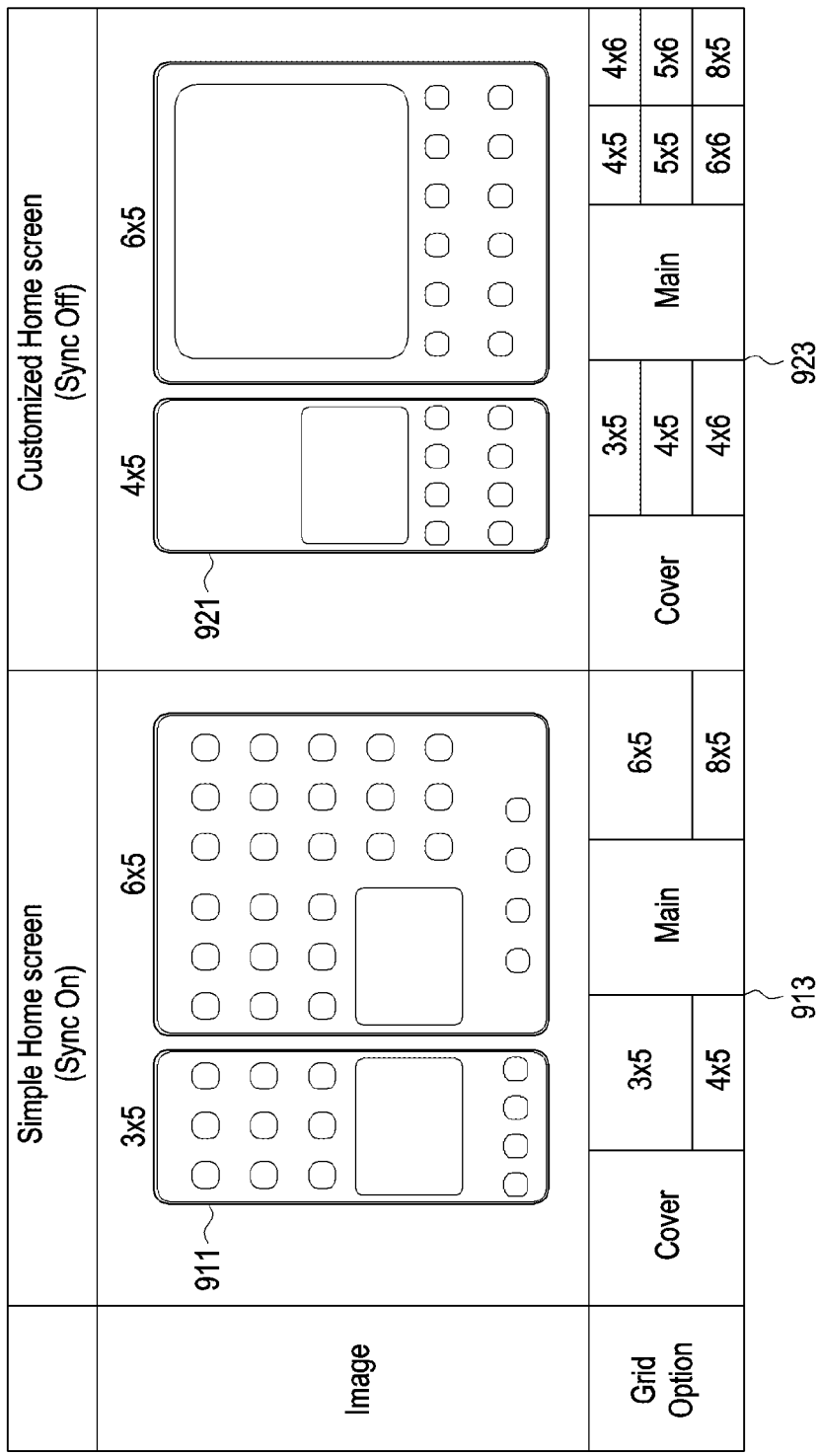
FIG. 9 is a diagram illustrating an example screen for screen management in an electronic device according to an embodiment.

FIG. 8 is a diagram illustrating example screens for screen management in an electronic device according to an embodiment, and FIG. 9 is a diagram illustrating example screens for screen management in an electronic device according to an embodiment.

Referring to FIG. 8, the electronic device 101 according to an embodiment may execute an application related to home screen management to display setting screens 810, 820 and 830 for managing a home screen on the display module 160. The electronic device 101 may activate or deactivate the synchronization mode on the setting screens 810, 820 and 830. The electronic device 101 may display the setting screen 810 for setting synchronization between home screens (e.g., home screen mirroring) to be displayed in a first display area and a second display area according to deformation of the display of the display module 160. The setting screen 810 may include an object 811 for setting synchronization between home screens, an object 813 for setting a home screen layout and for home and apps grid, and/or other objects related to a home screen configuration (e.g., show apps screen button on (home screen), lock home screen layout, add new apps to home screen (hide apps), app icon badges or swipe down for notification panel). When the object 811 for setting synchronization is set to on the setting screen 810, the electronic device 101 may display the setting screen 820 or 830 for activation or deactivation of the synchronization mode. The setting screen 820 may include an object 821 for switching the synchronization mode from the sync off state to the sync on state and images 823 of home screens displayed in the sync off state. The setting screen 830 may include an object 831 for switching the synchronization mode from the sync on state to the sync off state and images 833 of home screens displayed in the sync on state. When the object 821 indicating the synchronization mode is switched to the sync on state 822 on the setting screen 820, the electronic device 101 may switch to and display the setting screen 830 and set the sync on state as a current synchronization mode in response to a setting completion request to store related information in the memory.

Referring to FIGS. 8 and 9, upon selection of the object 813 for setting a home screen layout on the setting screen 810, the electronic device 101 according to an embodiment may display a setting screen (not shown) for setting a grip option. A grid option 913 for setting the size of the display area of a first home screen (simple home screen) 911 in the sync on state and a grid option 923 for setting the size of the display area of a second home screen (customized home screen) 921 in the sync off state may be provided. For example, the electronic device 101 may set the layouts (or the sizes of the display areas) of home screens to a grid value (e.g., 3×5) of the first display area and a grid value (e.g., 6×5) of the second display area selected from among the provided grid options. For example, the electronic device 101 may set the layouts (or the sizes of the display areas) of the home screens to a grid value (e.g., 4×5) of the first display area and a grid value (e.g., 6×5) of the second display area selected from among the provided grid options.

Figure 10:
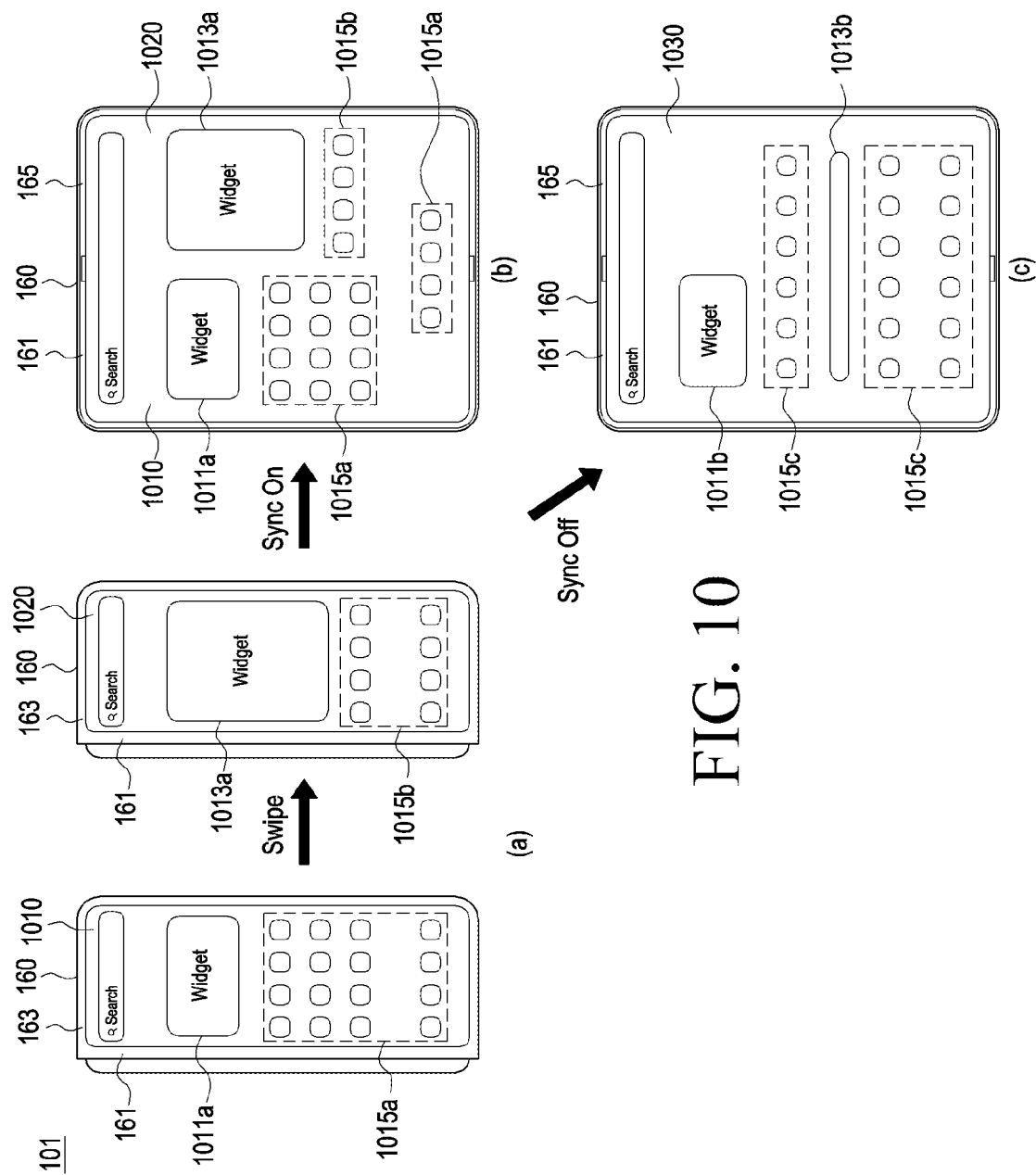
FIG. 10 is a diagram illustrating an example screen for screen management in an electronic device according to an embodiment.

FIG. 10 is a diagram illustrating example screens for screen management in an electronic device according to an embodiment.

Referring to FIG. 10, when the display 161 is in the first state (e.g., folded state), the electronic device 101 according to an embodiment may deform the display 161 to make visible the first display area to the outside, as illustrated in (a) of FIG. 10. The electronic device 101 may display a home screen 1010 including an executable mini-application (e.g., widget) 1011a and objects 1015a (e.g., execution icons) representing applications, in the first display area 163. The electronic device 101 may configure the home screen in a plurality of pages and may display the first screen 1010 of the first page in the first display area 163. The electronic device 101 may display a second screen 1020 of the next page including a second widget 1013a, in the first display area 163 according to a user's gesture (e.g., swipe). The second screen 1020 may include an executable mini-application (e.g., widget) 1013a and objects 1015b (e.g., execution icons) representing applications.

According to an embodiment, when the display 161 is in the second state (e.g., unfolded state) and the synchronization mode transitions to the sync on state, the electronic device 101 may display the first screen 1010 including the widget 1011a and the objects 1015a and the second screen 1020 including the widget 1013a and the objects 1015b as home screens in the second display area 165 through synchronization with the first screen 1010 and the second screen 1020 displayed in the first display area 163. Each of the widget 1011a included in the first screen 1010 and the widget 1013a included in the second screen 1020 may be displayed in a new widget view generated based on display attributes which have been changed based on the first state information and the second state information by the service module according to the sync on state.

According to an embodiment, when the display 161 is in the second state (e.g., unfolded state) and the synchronization mode transitions to the sync off state, the electronic device 101 may display a third screen 1030 that the user has set differently from the first screen 1010 and the second screen 1020 displayed in the first display area 163, as a home screen in the second display area 165. The third screen 1030 may include widgets 1011b and 1013b and objects 1015c (e.g., execution icons) representing applications. Each of the widgets 1011b and 1013b included in the third screen 1030 may be displayed in a widget view configured with display attributes (or layout) of a widget view specified by the service module for managing the applications.

Figure 11:
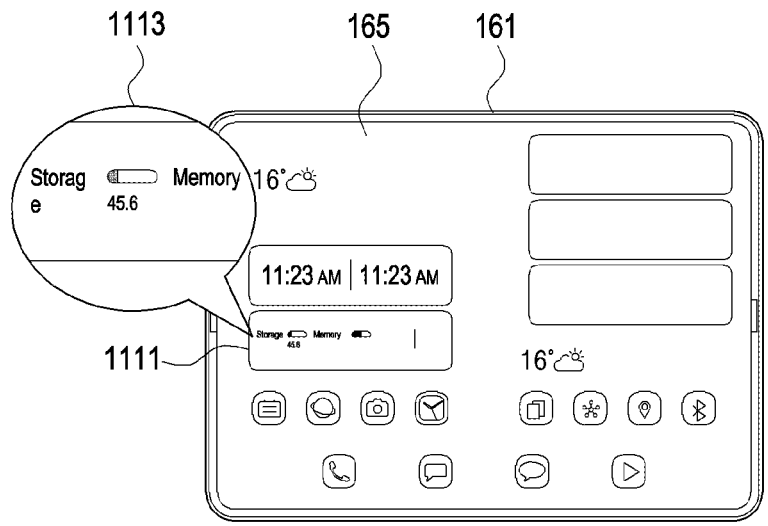
FIG. 11 is a diagram illustrating an example screen for screen management in an electronic device according to an embodiment.
Figure 11:
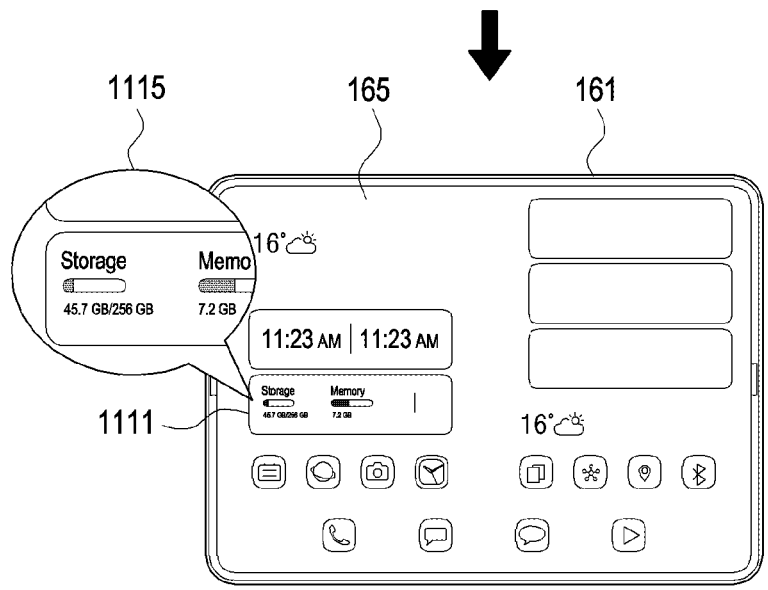

FIG. 11 is a diagram illustrating example screens for screen management in an electronic device according to an embodiment.

Referring to FIG. 11, when the electronic device 101 (e.g., the electronic device 101 of FIGS. 1 and 2) according to an embodiment identifies a change in the orientation of the display 161 by detecting rotation through at least one sensor, the electronic device 101 may obtain second state information including information detected by the at least one sensor and identify that the display 161 has switched from the portrait mode to the landscape mode based on the obtained second state information. When the orientation of the display 161 is changed to the landscape mode, the electronic device 101 may configure a home screen in the portrait layout. For example, as illustrated in (a) of FIG. 11, when a view generated with display attributes of the landscape layout in response to the landscape mode is applied, some objects of a widget 1111 may be cropped, as seen from a widget view 1113. To prevent and/or reduce some objects from being cropped, when a home screen is configured in the portrait layout, the electronic device 101 may change the display attributes of the widget 1111 to those of the portrait layout and display the widget 1111 in a second display area 165 through a widget view 1115 generated by applying the changed display attributes, as illustrated in (b) of FIG. 11.

Figure 12:
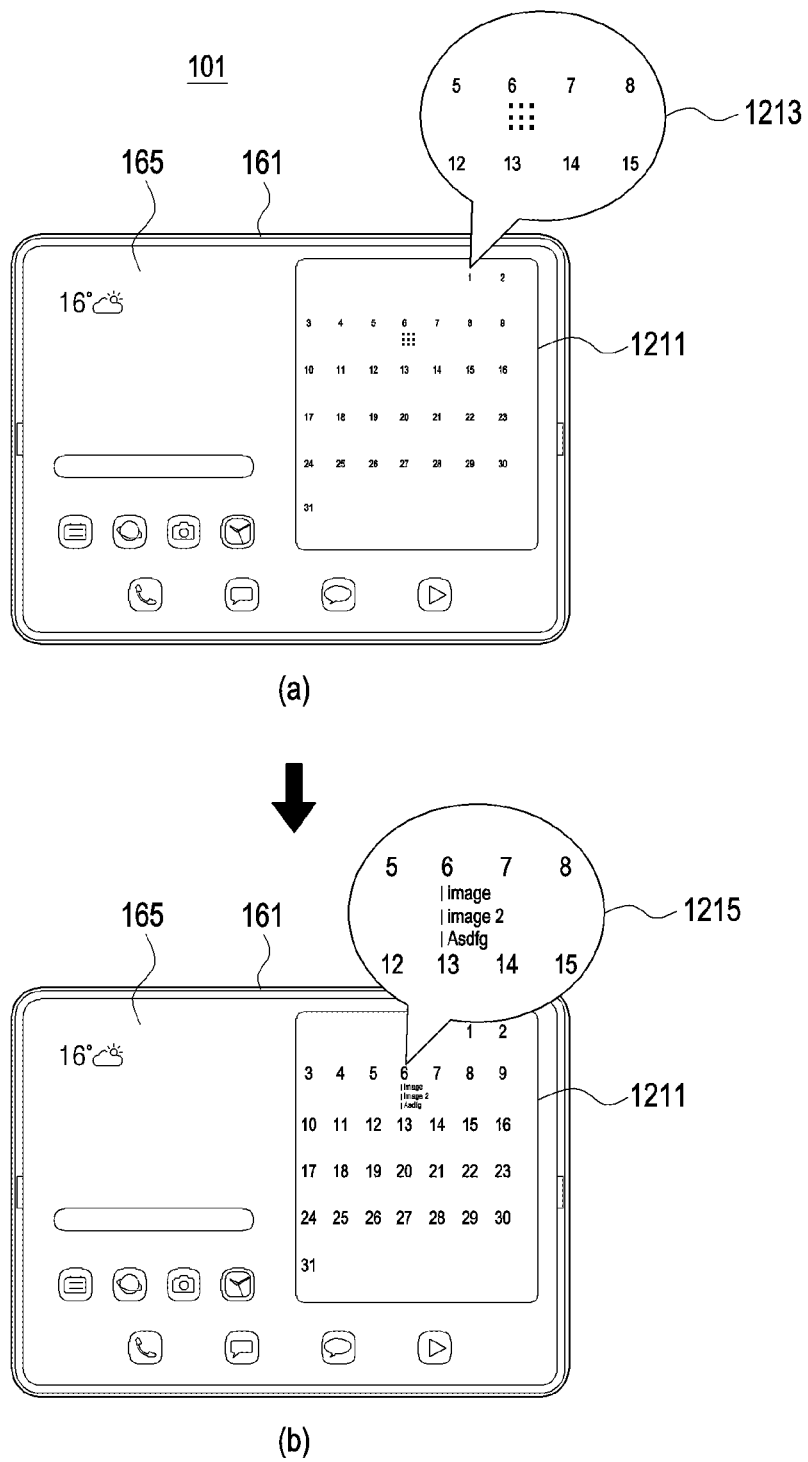
FIG. 12 is a diagram illustrating an example screen for screen management in an electronic device according to an embodiment.

FIG. 12 is a diagram illustrating example screens for screen management in an electronic device according to an embodiment.

Referring to FIG. 12, when the orientation of the display 161 is changed to the landscape mode, the electronic device 101 (e.g., the electronic device 101 of FIGS. 1 and 2) according to an embodiment may configure a home screen in the portrait layout. For example, as illustrated in (a) of FIG. 12, when a view generated with display attributes of the landscape layout in response to the landscape mode is applied, a widget 1211 may have decreased object visibility, as seen from a widget view 1213. To prevent and/or reduce the decrease of the visibility of objects, when configuring a home screen in the portrait layout, the electronic device 101 may change the display attributes of the widget 1211 to those of the portrait layout and display the widget 1211 in the second display area 165 through a widget view 1215 generated by applying the changed display attributes, as illustrated in (b) of FIG. 12.

Figure 13:
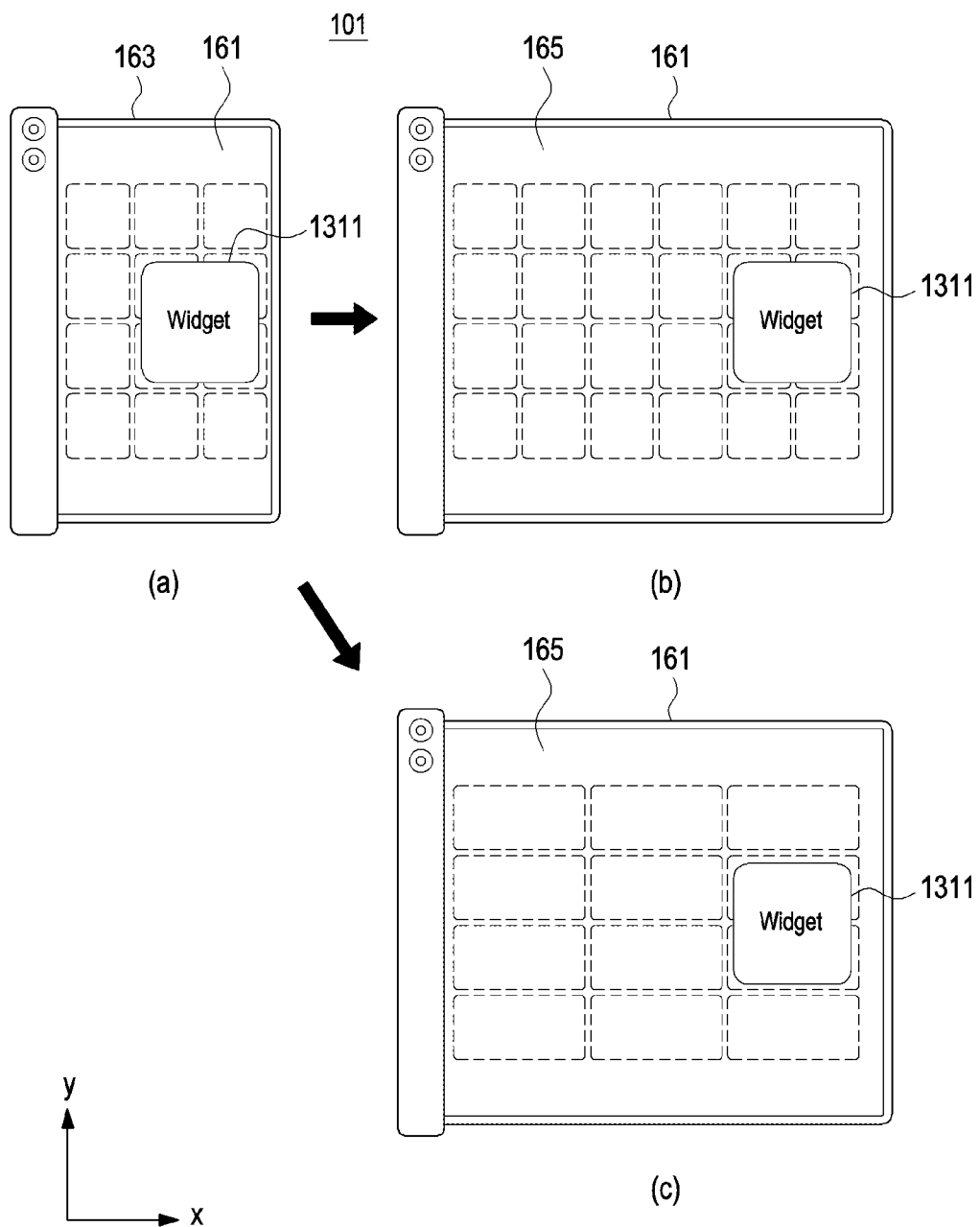
FIG. 13 is a diagram illustrating an example screen for screen management in an electronic device according to an embodiment.

FIG. 13 is a diagram illustrating example screens for screen management in an electronic device according to an embodiment.

Referring to FIG. 13, as the display 161 rolls or slides in a first direction (x-axis direction), the electronic device 101 (e.g., the electronic device 101 of FIGS. 1, 2, 4A, and 4B) according to an embodiment may identify deformation of the display 161. Default cell information (e.g., a default width/height) is changed according to the rolling or sliding of the display 161, and thus an area of the display 161 visually exposed to the outside may be gradually extended. For example, as illustrated in (a) of FIG. 13, when they axis is longer than the x axis similarly to in the portrait mode, the electronic device 101 may display a home screen and a widget view 1311 in the portrait layout in the first display area 163. For example, when the x axis becomes longer than the y axis similarly to in the landscape mode, the electronic device 101 may display a home screen and a widget view 1313 in the landscape layout specified by the service module in the second display area 165. For example, when identifying that the synchronization mode of the home screen is on based on first state information, the electronic device 101 may display the widget view 1311 in a newly generated portrait layout by changing the display attributes of a view specified in the landscape mode and applying the changed display attributes, to display the widget view 1311 in the portrait layout in the landscape mode. For example, when identifying that the synchronization mode of the home screen is off based on the first state information, the electronic device 101 may display a widget view 1313 in the landscape layout by applying the display attributes of the specified view as they are in the landscape mode, as illustrated in (c) of FIG. 13.

When identifying that the dark mode is on based on the first state information, the electronic device 101 (e.g., the electronic device 101 of FIGS. 1, 2, 3A, 3B, 4A, 4B, and 5) according to an embodiment may darken a screen by changing a brightness attribute of the screen to a specified value, and change at least one of a brightness attribute or a color attribute of the view of a mini-application (e.g., widget) based on the changed brightness attribute. The electronic device may display a home screen including the view of the mini-application (e.g., widget) with the changed at least one of the brightness attribute or the color attribute on the display (e.g., the display 161 of FIGS. 3A, 3B, 4A, 4B, and 5).

According to an example embodiment, a method of operating an electronic device (e.g., the electronic device 101 of FIGS. 1, 2, 3A, 3B, 3C, 4A, 4B, and 5) may include: obtaining first state information related to a screen configured to display objects of execution applications, obtaining second state information related to deformation of a display (e.g., the display 161 of FIGS. 3A, 3B, 3C, 4A, 4B, 5, 8, 10, 11, 12, and 13) included in a display module (e.g., the display module 160 of FIGS. 1, 3A, 3B, 3C, 4A, 4B, 5, and 8) of the electronic device, generating a view of a mini-application executable on the screen based on the first state information and the second state information, and displaying the screen configured to include the generated view of the mini-application in a display area visible to the outside based on the deformation of the display.

According to an example embodiment, the method may further include: based on a state of the screen being changed, the display being deformed, or information obtained by execution of at least one function of the mini-application being updated, re-generating the view of the mini-application and reconfiguring the screen including the re-generated view of the mini-application. The mini-application may be configured to execute the at least one function which is accessible, provided by a service module on the screen by a screen management module managing the screen, and the view of the mini-application may include an object representing the information obtained by execution of the at least one function.

According to an example embodiment, the method may further include: identifying the deformation of the display based on information detected by at least one sensor. Displaying the screen may include: based on the display being deformed to shrink, setting first display attributes corresponding to a first display area visible to the outside based on the deformation of the display, and displaying the screen in the first display area based on the first display attributes.

Displaying the screen may further include: identifying an inactive state of screen synchronization based on the first state information, based on the display being deformed to extend, setting second display attributes corresponding to a second display area visible to the outside based on the deformation of the display, and displaying the screen in the second display area based on the second display attributes. The second display attributes may be set to be different from the first display attributes.

According to an example embodiment, displaying the screen may further include: identifying an active state of screen synchronization based on the first state information, based on the display being deformed to extend, setting second display attributes corresponding to a second display area in synchronization with the first display attributes, and displaying the screen in the second display area based on the second display attributes.

According to an example embodiment, displaying the screen may further include: based on the screen displayed in the first display area being configured with a plurality of pages, identifying the number of pages to be displayed in a second display area corresponding to a layout of the first display area, and displaying a part of the plurality of pages in the second display area and hiding another part of the plurality of pages, based on the identified number of pages.

According to an example embodiment, the method may further include: identifying a state of the display based on rotation of the electronic device based on the second state information, based on the state of the display being identified as switched from a portrait mode to a landscape mode, changing first display attributes or second display attributes to display the screen in a vertical direction with respect to a reference line, and changing display attributes of the view of the mini-application to display the view of the mini-application included in the screen in the vertical direction.

According to an example embodiment, the method may further include: identifying a state of the display based on rotation of the electronic device based on the second state information, based on the state of the display being identified as switched from a landscape mode to a portrait mode, changing first display attributes or second display attributes to display the screen in a horizontal direction with respect to a reference line, and changing display attributes of the view of the mini-application to display the view of the mini-application included in the screen in the horizontal direction.

According to an example embodiment, generating a view of a mini-application may include: identifying activation of a dark mode based on the first state information, changing a brightness attribute of the screen to a specified value to darken the screen, and based on the brightness attribute of the screen being changed, changing at least one of a brightness attribute or a color attribute of the view of the mini-application.

According to an example embodiment, in a non-transitory computer-readable storage medium storing one or more programs, the one or more programs comprising executable instructions configured to, when executed by at least one processor of an electronic device, cause the electronic device to perform operations comprising: obtaining first state information related to a screen for displaying objects of execution applications, obtaining second state information related to deformation of a display, generating a view of a mini-application executable on the screen based on the first state information and the second state information, and displaying the screen configured to include the generated view of the mini-application in a display area visible to the outside based on the deformation of the display.

The embodiments of the disclosure are provided to aid the description and understanding of the technical contents, and not for limiting the scope of the disclosure. Accordingly, the scope of the disclosure should be understood as encompassing all modifications or various embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display module including a deformable display;
at least one processor electrically coupled to the display module; and
memory storing instructions that, when executed by the at least one processor individually and/or collectively, cause the electronic device to:
obtain first state information related to a screen for displaying at least one objects of execution applications,
obtain second state information related to deformation of the display,
obtain second state information related to deformation of the display,
configure a display attributes of at least one objects of a mini-application executable on the screen based on the first state information and the second state information;
generate a view of the mini-application based on the configured display attributes, and control the display module to display the screen configured to include the generated view of the mini-application in a display area visible to an outside based on the deformation of the display, wherein the first state information includes information related to at least one of a synchronization mode setting for specifying a synchronization state between first display attributes and second display attributes or a default cell height before the deformation of the display, and wherein the display attribute of the at least one object of the mini-application is configured based on at least one of the synchronization mode setting or a change in cell height during the deformation of the display.

2. The electronic device of claim 1, wherein instructions, when executed by the at least one processor individually and/or collectively, cause the electronic device to:

based on a state of the screen being changed, the display being deformed, or information obtained by execution of at least one function of the mini-application being updated, re-generate the view of the mini-application and reconfigure the screen including the re-generated view of the mini-application.

3. The electronic device of claim 2, wherein the mini-application is configured to execute the at least one function which is accessible, provided by a service module, on the screen by a screen management module managing the screen, and wherein the view of the mini-application includes an object representing the information obtained by execution of the at least one function.

4. The electronic device of claim 1, wherein instructions, when executed by the at least one processor individually and/or collectively, cause the electronic device to:

identify the deformation of the display based on information detected by at least one sensor, based on the display being deformed to shrink, set the first display attributes corresponding to a first display area visible to the outside based on the deformation of the display, and control the display module to display the screen in the first display area based on the first display attributes.

5. The electronic device of claim 4, wherein instructions, when executed by the at least one processor individually and/or collectively, cause the electronic device to:

identify an inactive state of the synchronization mode for screen synchronization based on the first state information, based on the display being deformed to extend, set the second display attributes corresponding to a second display area visible to the outside based on the deformation of the display, and control the display module to display the screen in the second display area based on the second display attributes, and wherein the second display attributes are different from the first display attributes.

6. The electronic device of claim 4, wherein instructions, when executed by the at least one processor individually and/or collectively, cause the electronic device to:

identify an active state of the synchronization mode for screen synchronization based on the first state information, based on the display being deformed to extend, set the second display attributes corresponding to a second display area in synchronization with the first display attributes, and control the display module to display the screen in the second display area based on the second display attributes.

7. The electronic device of claim 4, wherein instructions, when executed by the at least one processor individually and/or collectively, cause the electronic device to:

based on the screen displayed in the first display area being configured with a plurality of pages, identify a number of pages to be displayed in a second display area corresponding to a layout of the first display area, and control the display module to display one or more of the plurality of pages in the second display area, and hide another one or more of the plurality of pages, based on the identified number of pages.

8. The electronic device of claim 1, wherein instructions, when executed by the at least one processor individually and/or collectively, cause the electronic device to:

identify a state of the display based on rotation of the electronic device based on the second state information, based on the state of the display being identified as switched from a portrait mode to a landscape mode, change the first display attributes or the second display attributes to display the screen in a vertical direction with respect to a reference line, and change the display attributes of the at least one objects of the mini-application to display the view of the mini-application included in the screen in the vertical direction.

9. The electronic device of claim 1, wherein instructions, when executed by the at least one processor individually and/or collectively, cause the electronic device to:

identify a state of the display based on rotation of the electronic device based on the second state information, based on the state of the display being identified as switched from a landscape mode to a portrait mode, change the first display attributes or the second display attributes to display the screen in a horizontal direction with respect to a reference line, and change the display attributes of the at least one objects of the mini-application to display the view of the mini-application included in the screen in the horizontal direction.

10. The electronic device of claim 1, wherein instructions, when executed by the at least one processor individually and/or collectively, cause the electronic device to:

identify activation of a dark mode based on the first state information, change a brightness attribute of the screen to a specified value to darken the screen, and based on the brightness attribute of the screen being changed, change at least one of a brightness display attribute or a color display attribute of the at least one objects of the mini-application.

11. A method of operating an electronic device, comprising:

obtaining first state information related to a screen for displaying at least one objects of execution applications;

obtaining second state information related to deformation of a display included in a display module of the electronic device;

configuring a display attributes of at least one objects of a mini-application executable on the screen based on the first state information and the second state information;

generating a view of the mini-application based on the configured display attributes; and displaying the screen configured to include the generated view of the mini-application in a display area visible to an outside based on the deformation of the display, wherein the first state information includes information related to at least one of a synchronization mode setting for specifying a synchronization state between first display attributes and second display attributes or a default cell height before the deformation of the display, and wherein the display attribute of the at least one object of the mini-application is configured based on at least one of the synchronization mode setting or a change in cell height during the deformation of the display.

12. The method of claim 11, further comprising:

based on a state of the screen being changed, the display being deformed, or information obtained by execution of at least one function of the mini-application being updated, re-generating the view of the mini-application and reconfiguring the screen including the re-generated view of the mini-application, wherein the mini-application is configured to execute the at least one function which is accessible, provided by a service module on the screen by a screen management module managing the screen, and wherein the view of the mini-application includes an object representing the information obtained by execution of the at least one function.

13. The method of claim 11, further comprising:

identifying the deformation of the display based on information detected by at least one sensor, wherein displaying the screen comprises:

based on the display being deformed to shrink, setting the first display attributes corresponding to a first display area visible to the outside based on the deformation of the display; and displaying the screen in the first display area based on the first display attributes.

14. The method of claim 13, wherein displaying the screen further comprises:

identifying an inactive state of the synchronization mode for screen synchronization based on the first state information;

based on the display being deformed to extend, setting the second display attributes corresponding to a second display area visible to the outside based on the deformation of the display; and displaying the screen in the second display area based on the second display attributes, and wherein the second display attributes are different from the first display attributes.

15. The method of claim 13, wherein displaying the screen further comprises:

identifying an active state of the synchronization mode for screen synchronization based on the first state information;

based on the display being deformed to extend, setting the second display attributes corresponding to a second display area in synchronization with the first display attributes; and displaying the screen in the second display area based on the second display attributes.

16. The method of claim 13, wherein displaying the screen further comprises:

based on the screen displayed in the first display area being configured with a plurality of pages, identifying a number of pages to be displayed in a second display area corresponding to a layout of the first display area; and displaying one or more of the plurality of pages in the second display area, and hiding another one or more of the plurality of pages, based on the identified number of pages.

17. The method of claim 11, further comprising:

identifying a state of the display based on rotation of the electronic device based on the second state information;

based on the state of the display being identified as switched from a portrait mode to a landscape mode, changing the first display attributes or the second display attributes to display the screen in a vertical direction with respect to a reference line; and changing the display attributes of the at least one objects of the mini-application to display the view of the mini-application included in the screen in the vertical direction.

18. The method of claim 11, further comprising:

identifying a state of the display based on rotation of the electronic device based on the second state information;

based on the state of the display being identified as switched from a landscape mode to a portrait mode, changing the first display attributes or the second display attributes to display the screen in a horizontal direction with respect to a reference line; and changing the display attributes of the at least one objects of the mini-application to display the view of the mini-application included in the screen in the horizontal direction.

19. The method of claim 11, wherein generating the view of the mini-application comprises:

identifying activation of a dark mode based on the first state information;

changing a brightness attribute of the screen to a specified value to darken the screen; and based on the brightness attribute of the screen being changed, changing at least one of a brightness display attribute or a color display attribute of the at least one objects of the mini-application.

20. A non-transitory computer-readable storage medium having stored thereon one or more programs, the one or more programs comprising executable instructions that, when executed by at least one processor of an electronic device, cause the electronic device to perform operations comprising:

obtaining first state information related to a screen for displaying at least one objects of execution applications;

obtaining second state information related to deformation of a display included in a display module of the electronic device;

configuring a display attributes of at least one objects of a mini-application executable on the screen based on the first state information and the second state information;

generating a view of the mini-application based on the configured display attributes; and displaying the screen configured to include the generated view of the mini-application in a display area visible to an outside based on the deformation of the display, wherein the first state information includes information related to at least one of a synchronization mode setting for specifying a synchronization state between first display attributes and second display attributes or a default cell height before the deformation of the display, and wherein the display attribute of the at least one object of the mini-application is configured based on at least one of the synchronization mode setting or a change in cell height during the deformation of the display.

* * * * *